Inventor
Thomas S. Skillman
By Ward, Crosby & Neal
Attorneys

United States Patent Office 2,733,833
Patented Feb. 7, 1956

2,733,833

CONTROL ARRANGEMENT FOR ARTICLE DISPENSING SYSTEMS

Thomas S. Skillman, Mosman, near Sydney, New South Wales, Australia, assignor to Punch Engineering Pty. Limited, Sydney, New South Wales, Australia, a company of New South Wales Application November 1, 1951, Serial No. 254,280

Claims priority, application Australia November 6, 1950

6 Claims. (Cl. 221—7)

The invention relates to article dispensing systems and particularly to those systems in which it is desired to dispense batches of articles in rapid succession.

Article dispensing systems have been proposed in which articles may be released from storage and conveyed to one or more delivery points. Other arrangements permit several operators to select articles at the same time, and to deliver these articles in separate batches.

These arrangements suffer from the disadvantage that the articles of each batch, selected by an operator, are released one after the other and even in the case where several operators can select their batches simultaneously the release of articles can only proceed successively, and one batch of articles can only be released after the other. It is apparent that the time taken to release a large batch of articles is considerable and thus limits the rate at which batches of articles are delivered.

These disadvantages are overcome according to the invention by the provision of an article-dispensing system in which an indication representing the selection of each article of a batch of articles is electrically stored in registering means and in which all selected articles belonging to the batch are subsequently released simultaneously by the registering means, thus permitting the system to release another batch without delay and also reducing the time during which the dispensing apparatus is in operation with consequent reduction in wear.

It is a further feature of the invention to permit several operators to select articles at the same time and to provide means to release these articles in separate batches, and to prevent two operators releasing batches of articles simultaneously.

One embodiment of the invention will now be described in detail.

Figure 1:
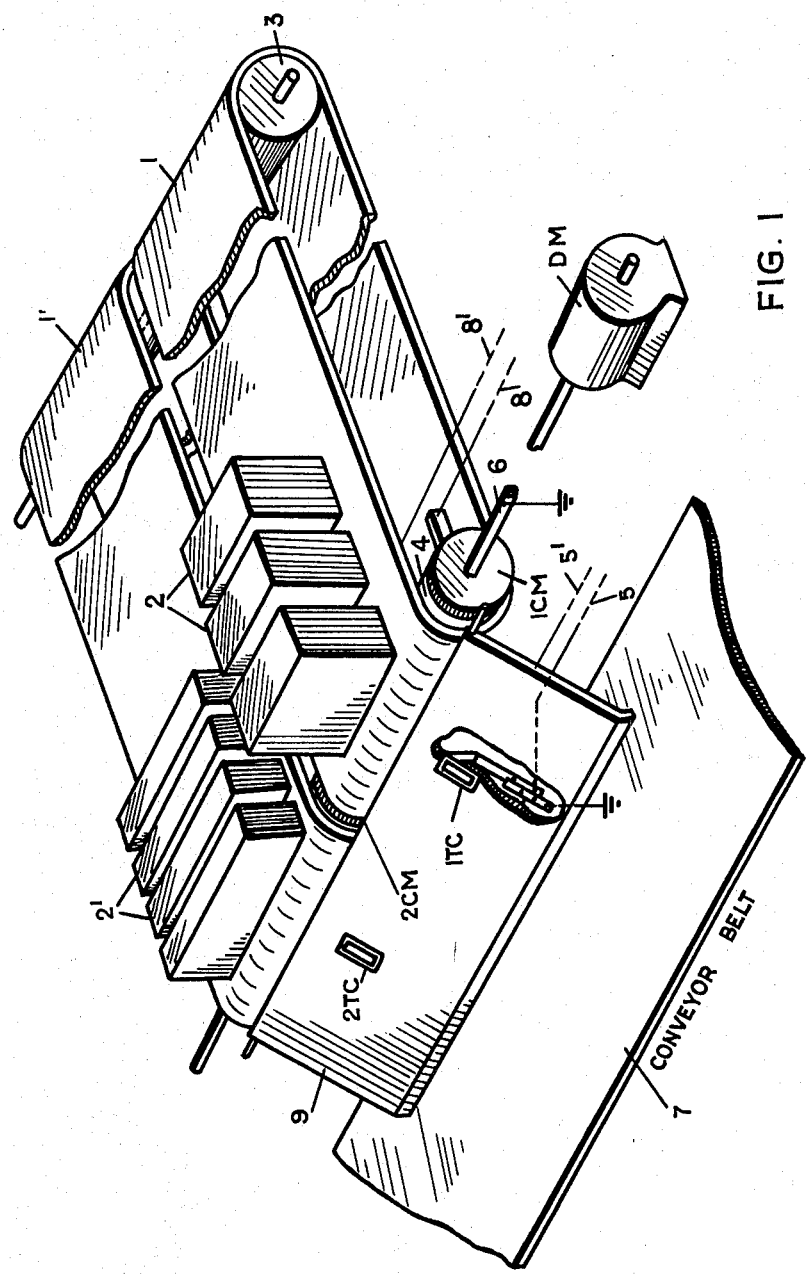
Fig. 1 shows two storage and releasing devices of a type which may be used in conjunction with the invention.

In Fig. 1 each storage and releasing device has a horizontally arranged storage belt 1, $1^1$ carrying articles 2, $2^1$ to be dispensed. The belts 1, $1^1$ pass around rollers 3 and 4, and each roller 4 contains an electromagnetic clutch 1CM, 2CM mounted on a constantly running shaft 6 driven by the motor DM, so that, when the clutch 1CM or 2CM is energised, the corresponding storage belt 1 or $1^1$, which carries the articles 2, $2^1$, moves forward until an article topples over the corresponding roller 4 onto a common conveyor belt 7. The clutches 1CM and 2CM are operated by electric circuits over wires 8 and $8^1$ respectively as will be described later. When an article topples from the storage belt 1 or $1^1$, it slides over a flap 9 and operates a corresponding trip contact 1TC or 2TC which is effective, by means of electric circuits over wires 5 and $5^1$ respectively to release the corresponding clutch and thus prevent the release of the next article on the storage belt.

The schematic diagram (Fig. 2) shows the selecting equipment for the operation of two releasing devices as shown in Fig. 1, but it will readily be seen that this equipment can be extended, as shown by the dotted lines, to cover as many storage and releasing devices as required. Provision is made for two operators to use the apparatus at the same time, but it is apparent that any number of operators may be associated with each storage and releasing device by adding additional circuits in parallel to those shown. For example the circuit in Fig. 3 provides for operation by three operators.

In the embodiment to be described each operator has an individual key for each article to be selected. Should it be preferred, however, selection may be effected by any known selecting means, whereby coded designations may be set up on digit keys, or other means, to effect selection of one of a large number of circuits.

Figure 2:
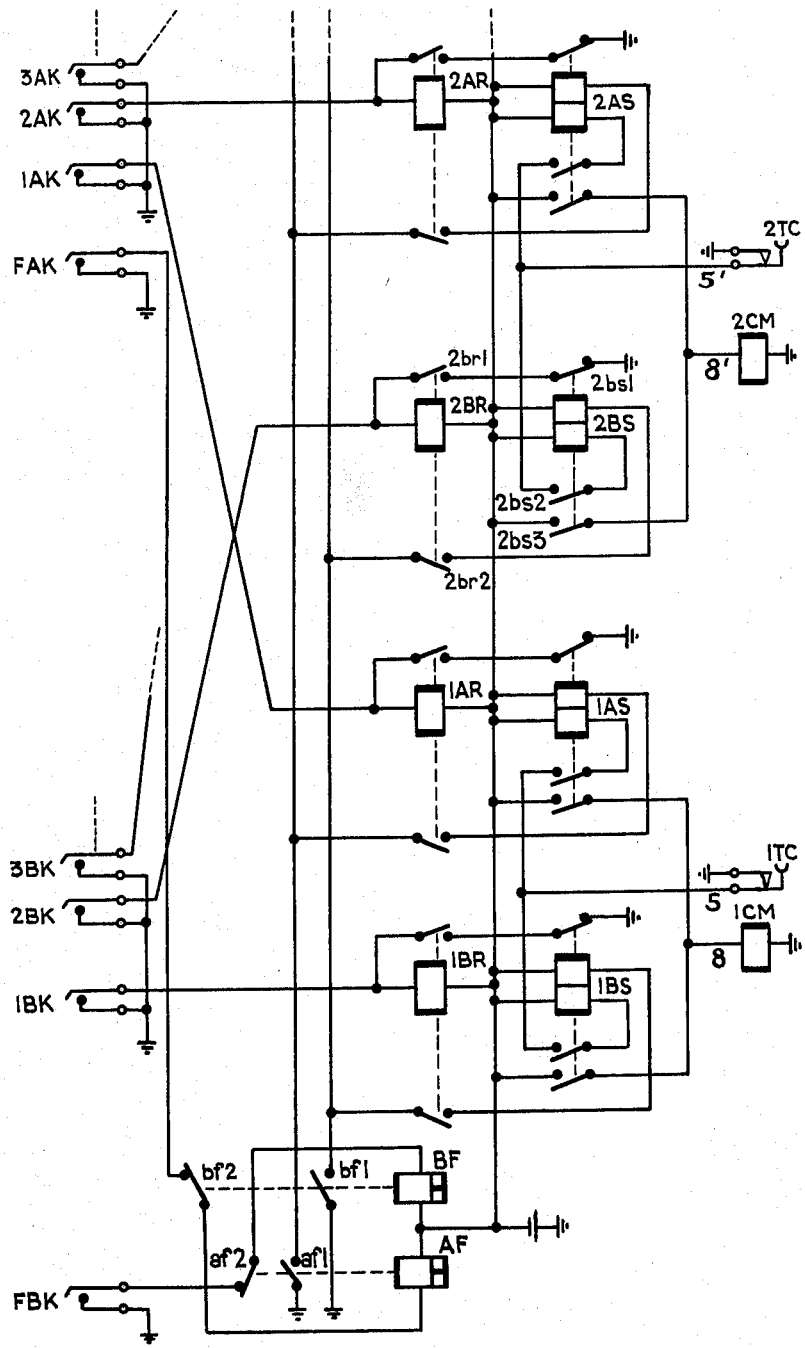
Fig. 2 is a schematic diagram of one type of electric circuit for operating the apparatus by two operators.
Figure 3:
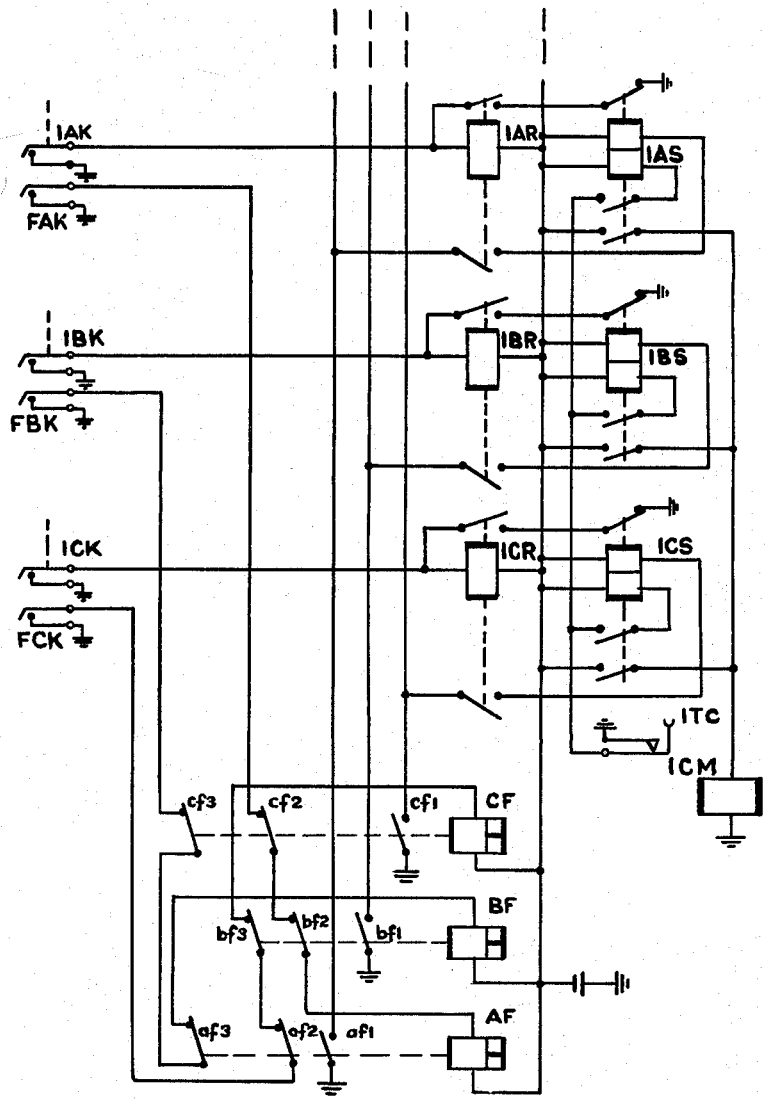
Fig. 3 is a similar diagram for operating the apparatus by three operators.

In Fig. 2 the clutches of the storage and releasing devices are indicated at 1CM and 2CM and the corresponding trip contacts are shown at 1TC and 2TC. Each storage and releasing device is associated with registering means consisting of an operating relay for each operator as indicated by the relays 1AS and 2AS for an operator A and relays 1BS and 2BS for an operator B, and the registering relays 1AR, 2AR, and 1BR, 2BR are connected with the selection circuits to store indications representing articles selected by the operators. The number of relays depends on the number of storage and releasing devices and the number of operators who have access to these devices. (An arrangement for three operators is shown in Fig. 3.) As mentioned before, individual keys for the selection of articles are shown in Fig. 2, each operator being provided with a set of keys 1AK, 2AK, 3AK . . . and 1BK, 2BK, 3BK . . . respectively, and each key being connected with corresponding registering means. To indicate when the selection of a batch of articles has been completed each operator has a delivery key FAK, FBK . . . which initiates the simultaneous release of the selected articles over a slow release relay AF, BF . . . . These relays ensure that only one batch of articles can be released at a time and being slow releasing provide enough time for a safe operation of all selected storage and releasing devices. Assuming that the operator B wishes to select the article associated with the key 2BK, the operator presses this key and operates registering relay 2BR from earth, operated key 2BK, relay 2BR, to battery. This relay closes its contacts 2br1 and 2br2 and locks over a circuit from earth, contact 2bs1, operated contact 2br1, relay 2BR, to battery. Should the operator A also wish to select this same type of article, operation of a corresponding key 2AK would result in the operation of relay 2AR in the same manner. Similar circuits may be set up by any operator for all articles that he wants to be delivered in the same batch.

After all articles belonging to one batch have been selected by the operation of the corresponding registering means, delivery of the articles is obtained by operation of a delivery key FAK, FBK . . . . For example, operation of key FBK operates the slow-release relay BF over a circuit from earth, operated key FBK, contact af2 relay BF, to battery. Relay BF operates its contacts bf1 and bf2. Operated contact bf2 prevents the operation of relay AF over key FAK until relay BF releases, and operated contact bf1 completes a circuit from earth over operated contact bf1, operated contact 2br2, relay 2BS, to battery. Relay 2BS locks over a circuit from earth, over trip contact 2TC, operated contact 2bs2, relay 2BS, to battery. Operated contact 2bs1 breaks the circuit for the registering relay 2BR which releases. Operated contact 2bs3 applies battery to the clutch 2CM which operates to moves the belt 1 (Fig. 1) and deliver an article. When an article topples from the belt and strikes the trip contact 2TC the circuit for relay 2BS is broken and this relay releases, thus in turn releasing the clutch 2CM.

Similarly, operation of the relay BF will operate all the releasing devices which have been conditioned for operation by the operation of relays 1BR, 2BR, etc., while any relays 1AR, 2AR, etc. associated with the same releasing devices but under the control of an operator A are unaffected by operation of key FBK but will respond to operation of key FAK, which energises relay AF as soon as relay BF has released. Relays AF and BF are slow-releasing relays, and the release lag of any of these relays is long enough to ensure that the operation of the other relay AF or BF is blocked by operated contact $af2$ or $bf2$, until the released articles are clear of the apparatus. For any additional operator a further slow-release relay is provided and additional contacts of this relay are included in the circuits of the AF and BF relay and vice versa.

Where, for example, three operators are to operate the same storage and releasing devices, a circuit can be used as shown in Fig. 3. The three operators' positions are indicated by the selection keys 1AK, 1BK and 1CK respectively which operate the corresponding relays 1AR, 1BR and 1CR as described above in connection with Fig. 2. The delivery of articles is obtained by operation of a delivery key FAK, FBK, FCK. The operation of one release key, say FBK, operates the slow-release relay BF over a circuit from earth, operated key FBK, contact $cf3$, contact $af3$, relay BF to battery. Relay BF operates its contacts $bf1$, $bf2$ and $bf3$. Operated contact $bf2$ prevents the operation of relay AF over key FAK until relay BF releases and operated contact $bf3$ similarly prevents the operation of relay CF over key FCK. Operated contact $bf1$ completes the circuits for relay 1BS and the clutch 1CM as described above in connection with Fig. 2.

Similarly, operation of key FAK operates relay AF with contacts $af1$, $af2$ and $af3$, and thus performs the release of an article over relay 1AS, and operation of key FCK operates relay CF with contacts $cf1$, $cf2$ and $cf3$, and releases an article over relay 1CS. In each case any of the relays AF, BF or CF interrupts when energised the operating circuits for the remaining relays. Although in Fig. 3 only one clutch 1CM is shown, further clutches can be operated in the same way as, for example, indicated in Fig. 2.

Where only one operator is required for the apparatus, only one set of keys 1AK—3AK etc. need be fitted and the relays 1BR, 2BR . . . 1BS, 2BS . . . and BF and corresponding circuits associated with the other operators may be deleted.

I claim:

1. In a system for dispensing articles of varied character from a plurality of storage and releasing devices: a selecting mechanism operable to give indications representing the selection of each article of a batch of articles; registering means and electrical connections therefrom to said storage and releasing devices and said selecting mechanisms, said registering means including a first relay and a second relay individual to each of said storage and releasing devices, said first relay being operable by said selecting mechanism to close a locking circuit for itself and to prepare a circuit for said second relay; control means electrically connected with said second relays and operable to actuate simultaneously said prepared second relays, said relays breaking the locking circuits of said first relays, closing locking circuits for themselves and operating the corresponding storage and releasing devices; and a contact device associated with each storage and releasing device electrically interposed in the locking circuit of the corresponding second relay and operable by an article released from the corresponding storage and releasing device to break said locking circuit.

2. In a system for dispensing articles of varied character from a plurality of storage and releasing devices: a plurality of selecting mechanisms each operable to give indications representing the selection of each article of a batch of articles; registering means and electrical connections therefrom to said storage and releasing devices and said selecting mechanisms, said registering means including a plurality of first and second relays for each storage and releasing device, each of said first relays being independently operable by a corresponding selecting mechanism to close a locking circuit for itself and to prepare a circuit for the second relay associated therewith; a plurality of control means, one for each of said selecting mechanisms, and electrically connected with the corresponding second relays, each control means being operable to simultaneously actuate the second relays conditioned by its corresponding selecting mechanism, to break the locking circuits of said first relays, to close locking circuits for themselves and to operate the corresponding storage and releasing devices; and a contact device associated with each storage and releasing device electrically interposed in the locking circuit of the corresponding second relay and operable by an article released from the corresponding storage and releasing device to break said locking circuit.

3. In a system for dispensing articles of varied character from a plurality of storage and releasing devices: a plurality of selecting mechanisms each operable to give indications representing the selection of each article of a batch of articles; registering means and electrical connections therefrom to said storage and releasing devices and said selecting mechanisms, said registering means including a plurality of first and second relays for each storage and releasing device, each of said first relays being independently operable by a corresponding selecting mechanism to close a locking circuit for itself and to prepare a circuit for the second relay associated therewith; a plurality of control means, one for each of said selecting mechanisms and electrically connected with the corresponding second relays, each control means including a blocking relay operable to interrupt the operating circuits of all other control means and to simultaneously actuate the second relays conditioned by their corresponding selecting mechanism to break the locking circuits of said first relays, to close locking circuits for themselves and to operate the corresponding storage and releasing devices; and a contact device associated with each storage and releasing device, electrically interposed in the locking circuit of the corresponding actuated second relay and operable by an article released from the corresponding storage and releasing device to break said locking circuit.

4. In a system for dispensing articles of varied character from a plurality of storage and releasing devices: a plurality of selecting mechanisms each adapted for the individual selection of any of a plurality of articles forming a batch; a plurality of registering means and electrical connections from each of said registering means to a corresponding selecting mechanism and to each of said storage and releasing devices; each of said selecting mechanisms including means operable to transmit to corresponding registering means indications representing each individual selection of an article of said batch of articles, said registering means electrically storing said indications and conditioning the selected storage and releasing devices for operation; and a plurality of control means associated with corresponding selecting mechanisms and electrically connected with corresponding registering means, each control means being adapted to operate simultaneously the storage and releasing devices conditioned by said corresponding registering means, each of said control means including blocking means electrically connected with all other control means and operable on actuation of a corresponding control means to interrupt the electrical connections between all other control means and the corresponding registering means.

5. In a system for dispensing articles of varied character from a plurality of storage and releasing devices: a selecting mechanism; registering means and electrical connections therefrom to said selecting mechanism and to each of said storage and releasing devices; said selecting mechanism including successively operable contact means to select one after the other articles of varied character forming a batch of articles and to transmit over said electrical connections to said registering means indications representing the successive selections of said articles forming said batch; said registering means including relay means to store electrically each of said indications and to condition the selected storage and releasing devices for operation; and control means common to said registering means and including contact means operable after the selection of said batch of articles to actuate simultaneously the storage and releasing devices conditioned for operation by said registering means to effect the simultaneous release of all successively selected articles of said batch.

6. In a system for dispensing articles of varied character from a plurality of storage and releasing devices: a plurality of selecting mechanisms; registering means and electrical connections therefrom to each of said selecting mechanisms and to each of said storage and releasing devices; each of said selecting mechanisms including successively operable contact means to select one after the other articles of varied character forming a batch of articles and to transmit over said electrical connections to said registering means indications representing the successive selections of said articles forming said batch; said registering means including relay means to store electrically each of said indications and to condition the selected storage and releasing devices for operation; and a plurality of control means associated with corresponding selecting mechanisms and common to said storage and releasing devices, each control means including contact means operable after the selection of a batch of articles by a corresponding selecting mechanism to actuate simultaneously the storage and releasing devices conditioned for operation by said selecting mechanism to effect the simultaneous release of all successively selected articles of said batch.

References Cited in the file of this patent

UNITED STATES PATENTS

| | | |
|---|---|---|
| 1,981,783 | DeBussey | Nov. 20, 1934 |
| 2,374,537 | Goldsmith | Apr. 24, 1945 |
| 2,371,491 | Wright | Mar. 13, 1945 |
| 2,470,916 | Carruthers | May 24, 1949 |
| 2,500,437 | Tandler | Mar. 14, 1950 |
| 2,567,241 | Skillman | Sept. 11, 1951 |
| 2,590,736 | Tandler | Mar. 25, 1952 |
| 2,593,102 | Caruso | Apr. 15, 1952 |
| 2,599,906 | Farmer | June 10, 1952 |